(12) United States Patent
Spazier

(10) Patent No.: US 7,665,869 B2
(45) Date of Patent: Feb. 23, 2010

(54) LIGHT FOR THE PASSENGER COMPARTMENT OF A MOTOR VEHICLE

(75) Inventor: Norbert Spazier, Bondorf (DE)

(73) Assignee: Daimler AG, Stuttgart (DE)

( * ) Notice: Subject to any disclaimer, the term of this patent is extended or adjusted under 35 U.S.C. 154(b) by 254 days.

(21) Appl. No.: 10/583,957

(22) PCT Filed: Dec. 10, 2004

(86) PCT No.: PCT/EP2004/014081

§ 371 (c)(1),
(2), (4) Date: Jul. 25, 2007

(87) PCT Pub. No.: WO2005/063526

PCT Pub. Date: Jul. 14, 2005

(65) Prior Publication Data

US 2008/0259623 A1   Oct. 23, 2008

(30) Foreign Application Priority Data

Dec. 23, 2003   (DE) ................ 103 60 729

(51) Int. Cl.
*B60Q 3/02* (2006.01)
(52) U.S. Cl. .............. 362/479; 362/490; 362/330
(58) Field of Classification Search ........... 362/153, 362/320, 330, 471, 479, 488, 490, 492, 606, 362/607, 608, 611–613, 617, 619, 621, 630, 362/631, 632, 543–546, 800, 806
See application file for complete search history.

(56) References Cited

U.S. PATENT DOCUMENTS 6,402,354 B1 * 6/2002 Tatewaki et al. ............ 362/490
6,666,571 B2 * 12/2003 Becher et al. ............... 362/490

FOREIGN PATENT DOCUMENTS

| DE | 101 26 868 C1 | 11/2002 |
| DE | 202 04 263 U1 | 9/2003 |
| DE | 102 59 828 A1 | 7/2004 |
| DE | 198 52 593 B4 | 3/2006 |
| EP | 1 154 199 A1 | 11/2001 |
| EP | 1 234 721 A2 | 8/2002 |
| EP | 1 344 684 A2 | 9/2003 |
| EP | 1 437 215 A1 | 7/2004 |
| FR | 2 738 783 A1 | 3/1997 |
| GB | 2 126 328 A | 3/1984 |
| JP | 02084684 A * | 3/1990 |
| WO | WO 03/024649 A1 | 3/2003 |
| WO | WO 2004/009349 A1 | 1/2004 |
| WO | WO 2005/018283 A1 | 2/2005 |

OTHER PUBLICATIONS

International Search Report dated Apr. 5, 2005 with an English translation of the pertinent portions (Twelve (12) pages).
German Office Action dated Mar. 22, 2006. (Three (3) pages).

* cited by examiner

*Primary Examiner*—Hargobind S Sawhney
(74) *Attorney, Agent, or Firm*—Crowell & Moring LLP

(57) ABSTRACT

An interior lamp is provided for illuminating an interior of a vehicle having a glass surface, particularly a glass roof. At least one such interior lamp is integrated in the laminated glass of the glass surface.

10 Claims, 2 Drawing Sheets

Structure for the Output with Shading

Total Reflection

LIGHT FOR THE PASSENGER COMPARTMENT OF A MOTOR VEHICLE

BACKGROUND AND SUMMARY OF THE INVENTION

This invention relates to an interior lamp for transport devices, such as an aircraft or a motor vehicle.

An interior lamp of this type for a motor vehicle is disclosed in European Patent Document EP 1 344 684 A1. This interior lamp, which is for motor vehicles, is equipped with a lens made of glass or plastic which covers the lamp or lamps. On its surface, this lens has optical elements for scattering or deflection of the emitted light. Preferably, the interior lamp is to be used as a reading light. At least a portion of the optical elements provided on the lens have a first central, non-diffusely scattering area and a second, diffusely scattering area completely or partially surrounding this first area. This special structure in the edge area of the optical elements provided on the lens reduces the glare effect of the interior lamp or of the reading light generated by the latter. The edge areas of the optical elements, which primarily are not intended for the light distribution, by means of their diffusely scattering surface structure, reduce the glare for the vehicle occupants or the observers.

This type of interior lamp has the disadvantage that it is generally arranged separately from a glass roof. The glass surface or the glass roof and the interior lamp therefore require space. Particularly with a glass roof, the space where the interior lamp is normally situated is occupied by the glass roof. This has the result that the interior lamp has to be arranged at a less suitable location. This results in a less optimal illumination of the vehicle interior.

It is therefore an object of the invention to create a construction of the interior lamp which can easily be integrated into a glass surface and therefore requires no additional space.

Although a glass surface is present, the invention therefore endeavors to arrange the interior lamp at its customary location without interfering with the function of the glass roof. In addition, as a result of the arrangement of the interior lamp, the glass surface should remain largely usable as a glass surface.

The interior lamp is advantageously installed directly into the glass roof, so that, when the light source is switched off, only a small frame separating the glass of the lens of the interior lamp from the glass pane of the glass roof will be visible. The glass of the interior lamp is as transparent with respect to light as the normal glass of the glass roof. The function of the glass roof is not limited by the arrangement of the interior lamp in the glass roof. The switching-on of the interior lamp, for example, when it is dark, causes the light output from the glass. As a result, the entire output surface is used as a lamp. This results in a saving of space for the interior lamp, because the interior lamp is integrated in the space of the already existing glass roof.

The invention will be explained in detail by way of a description of the figures.

DETAILED DESCRIPTION OF THE INVENTION

Figure 1:
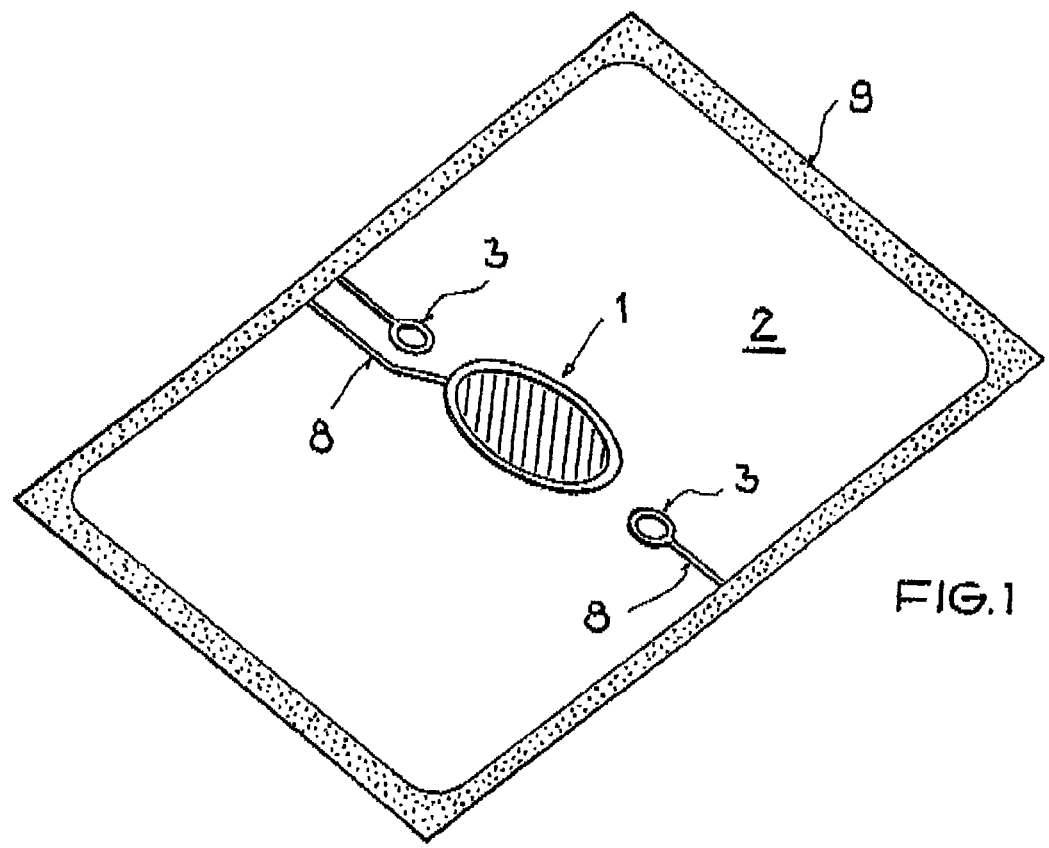
FIG. 1 is a schematic representation of an interior lamp in the glass roof.

FIG. 1 is a schematic representation of an interior lamp in the glass roof 2 of a motor vehicle. The interior lamp, with one central light 1 and two "down" lights 3, is arranged in recesses in the glass of the glass roof 2. The interior lamp 1, 3 has a housing 4, which has a ring-shaped printed-circuit board 5 with light-emitting diodes 6 and the pertaining electronic system. The lamp also has a ring-shaped receiving slot for the printed-circuit board 5 in the housing 4 and an output element 7, which is arranged inside the housing 4 and preferably corresponds to a glass pane. The supply and control of the printed-circuit board 5 takes place by way of leads 8, which are integrated in the glass, preferably a laminated glass, of the glass roof 2, similar to a heatable rear window pane. The leads 8 extend from the glass frame 9 to the housing 4 into which the printed-circuit board 5 and the output element 7 are inserted.

Figure 2:
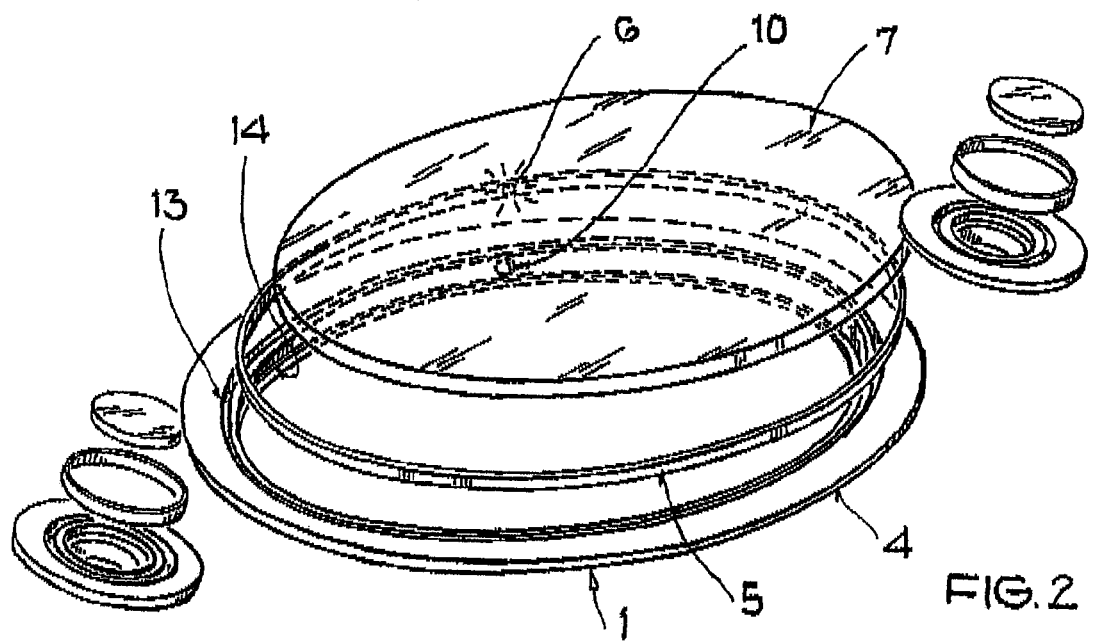
FIG. 2 is a schematic representation of the individual components of the interior lamp in the glass roof.

As illustrated in FIG. 2, the light-emitting diodes 6 arranged on the printed-circuit board 5 emit their light laterally into the output element 7 which preferably is a transparent pane made of glass or plastic. Openings 10, which are each assigned to a light emitting diode 6, are arranged in the housing 4. The light of the light-emitting diode 6 is coupled into the output element 7 through these openings 10. The light is guided through the output element 7 and, at its surface pointing to the vehicle interior, leaves the output element 7 into the vehicle interior.

Different interior lamps 1, 3 are arranged in the glass roof 2, which, depending on the size and the emitting light intensity, are used as the interior lamp 1 or as down lights 3, that is, reading lights. The interior lamp 1 with the larger output element 7 is used as the central light, while the interior lamps 3 with the smaller output element are used as reading lamps. The supply and control leads 8 are guided from the edge of the glass roof 2 in the laminated glass to the housing 4 of the interior lamps 1. These supply and control leads are electric lines which, in the laminated glass, lead to the housing 4 of the interior lamp 1 and thus to the printed-circuit board 5 with the light-emitting diodes 6 arranged thereon.

The printed-circuit board 5 is in each case constructed as a flat ring which can be inserted into a groove of the housing 4 and is arranged around the edge of the output element 7. The printed-circuit board 5 is arranged in the housing 4 in such a manner that the ring is completely covered by a portion of the housing 4. At certain points, the housing 4 has openings 10 which are assigned to the individual light-emitting diodes 6. The light of the light-emitting diodes 6 can pass through these openings 10 and can be coupled into the glass pane 7. As a result of the number of the light-emitting diodes 6 and of the size of the glass pane 7, the function of the interior lamp 1 can be differentiated with respect to the pure interior lamp 1, the reading lamp or lamps 3, the ambient light function, make-up illumination, a down light or, for example, a sleep light. As a further development, the interior lamp 1, 3 can be integrated between an interior pane and an upper exterior pane. These panes are primarily used for the stabilization but also for the protection of the components arranged in-between. The upper exterior pane is provided as a roof of a vehicle and consists of a hard glass, such as a mineral glass, so that the glass roof 2 is protected when harder objects impact on the glass roof 2 from above. The interior pane may also be made of mineral glass. The three glass panes are connected to form a laminated glass pane. So that the glass composite does not form an extreme buildup, the housings 4, which form a portion of the interior lamp 1, 3, are very flat. The geometry of the housings 4 with the output elements 7 situated therein will differ and may, for example, have a square, rectangular, round, oval, or any other shape. The housings 4 also have a lid so that the printed-circuit boards 5 with the various components situated therein will no longer be visible. The housings 4 with the output elements 7 do not have to be flat, and may also be adapted to the roof contour.

FIG. 2 is a schematic representation of the individual components of the interior lamp 1, 3 in the glass roof 2. The interior lamp 1, 3 has a housing 4, into which a printed-circuit board 5 can be inserted, which has an electronic system and the light-emitting diodes 6, and into which an output element 7 can be inserted as an illuminant. The housing 4 has a groove into which the printed-circuit board 5 with the light-emitting diode 6 and the electronic system can be invisibly inserted. The printed-circuit board 5 can be inserted as a ring into the groove 13 provided for this purpose, the light-emitting diodes 6 being arranged on the printed-circuit board on the interior side toward the glass. The housing 4 then has openings 10 for the coupling of the light of the light-emitting diodes 6 into the output element 7, which openings 10 are assigned to a light-emitting diode 6 arranged on the printed circuit board 5. The output element 7 corresponds to a glass pane which is arranged in another groove 14 of the housing 4. This entire component will then be arranged between two glass panes and joined to form the laminated glass. The electric lines 8 for supplying the printed-circuit board 5 are guided through this composite glass from the roof frame to the housing 4.

The glass roof 2 has the contour of the roof which, although planar as shown, may also be curved. In this case, the flat housing 4 with the output element 7 is adapted to the roof contour. In the case of a curved glass roof 2, the glass pane of the output element 7 is curved, so that a uniform surface of the glass roof 2 is formed which has no corners and edges. The two interior and exterior panes forming the laminated glass are then curved, correspondingly forming the shape of the glass roof 2.

Figure 3:
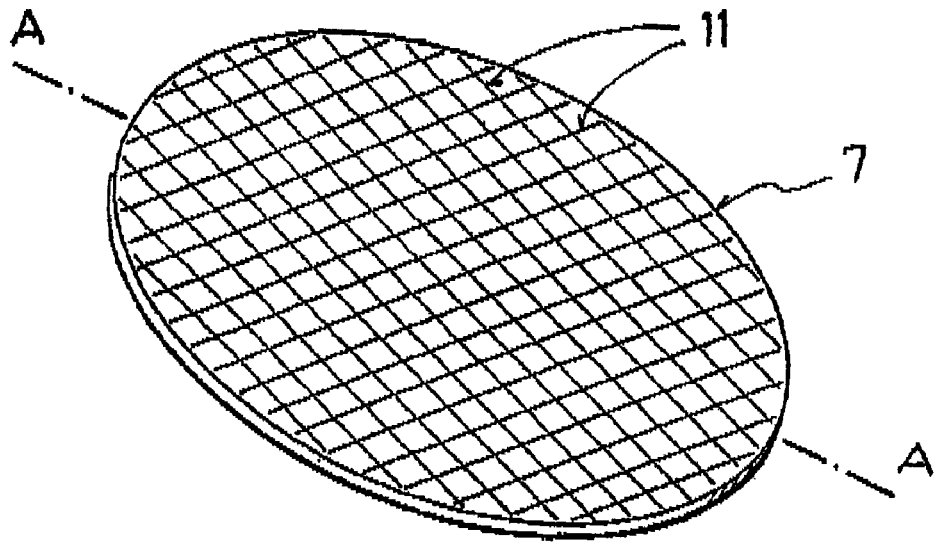
FIG. 3 is a view of the output element.

As illustrated in FIG. 3, the output element 7 preferably has an oval construction, having light output grooves constructed in the surface. The light output grooves 11 have a V-shaped structure so that the light output takes place on the surface in the direction of the vehicle interior.

Figure 4:
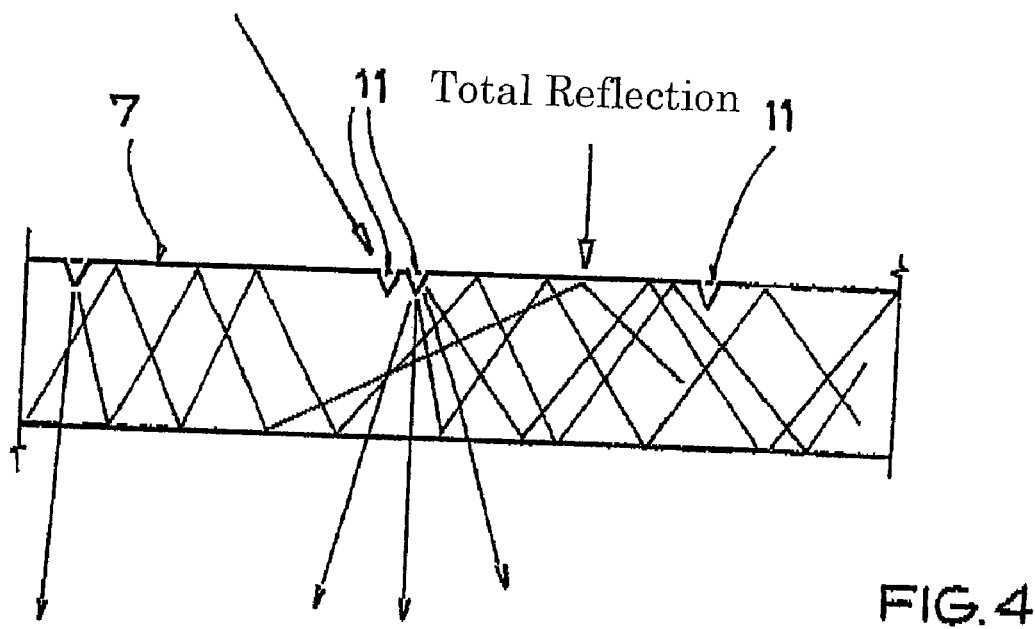
FIG. 4 is a sectional view of the transparent output element.

As illustrated in FIG. 4, the surface of the output element 7 is such that the light remains caught therein by total reflection and exits from the output element 7 only at the light output grooves 11.

However, the housing may also have a different arbitrary shape and may have a square, rectangular or round construction. In the case of a square shape, the interior lamp 1 has a square output element 7 and a square illuminant.

The invention claimed is:

1. An interior lamp device according to claim for a transport device, comprising:
   laminated glass with a transparent glass surface, and
   at least one lamp received in at least one opening defined in an area of the laminated glass with the glass surface for illuminating an interior of the transport device,
   wherein the interior lamp has a printed-circuit board with light-emitting diodes and an associated electronic system,
   wherein the light-emitting diode, for a lighting function, is coupled into a light output, panel, and
   wherein the light output panel is a glass pane with an edge area into which the light of the light-emitting diode is coupled.

2. The interior lamp device according to claim 1, wherein the interior lamp has a housing into which the printed-circuit board and the light output panel are inserted.

3. The interior lamp device according to claim 2, wherein the housing has a groove for the printed-circuit board and a groove for the light output panel, and wherein openings are provided in the housing such that light of the light-emitting diodes can be coupled into the light output panel.

4. The interior lamp according to claim 3, wherein the housing is a flat housing that, with the light output panel, is shaped to a contour of the roof.

5. The interior lamp according to claim 2, wherein the housing is a flat housing that, with the light output panel, is shaped to a contour of the roof.

6. The interior lamp according to claim 2, further comprising supply and control lines that extend from an edge of the laminated glass to the housing.

7. The interior lamp according to claim 2, wherein the housing and the light output panel have square, rectangular, round, or oval geometrical shapes.

8. The interior lamp according to claim 3, further comprising supply and control lines that extend from an edge of the laminated glass to the housing.

9. The interior lamp according to claim 5, further comprising supply and control lines that extend from an edge of the laminated glass to the housing.

10. The interior lamp according to claim 1, wherein the housing and the light output panel have square, rectangular, round, or oval geometrical shapes.

* * * * *

UNITED STATES PATENT AND TRADEMARK OFFICE
CERTIFICATE OF CORRECTION

PATENT NO.       : 7,665,869 B2                             Page 1 of 1
APPLICATION NO.  : 10/583957
DATED            : February 23, 2010
INVENTOR(S)      : Norbert Spazier It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Fourth Day of January, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,665,869 B2 | |
| APPLICATION NO. | : 10/583957 | |
| DATED | : February 23, 2010 | |
| INVENTOR(S) | : Norbert Spazier | |

It is certified that error appears in the above-identified patent and that said Letters Patent is hereby corrected as shown below:

In column 4, lines 4-5, delete "An interior lamp device according to claim for a transport device," and insert --An interior lamp device for a transport device,--.

In column 4, line 14, delete "coupled into a light output, panel," and insert --coupled into a light output panel,--.

In column 4, line 16, delete "into which the light of the light-emitting diode" and insert --into which the light-emitting diode--.

Signed and Sealed this
Tenth Day of April, 2012

David J. Kappos
*Director of the United States Patent and Trademark Office*